J. H. DUNBAR.
SAW CLAMP.
No. 29,956.
Patented Sept. 11, 1860.
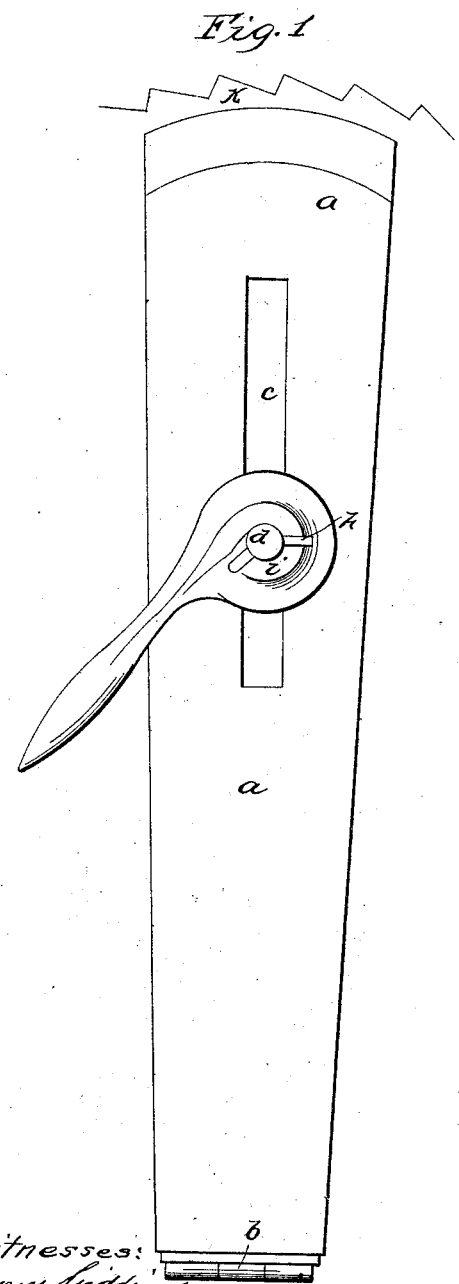
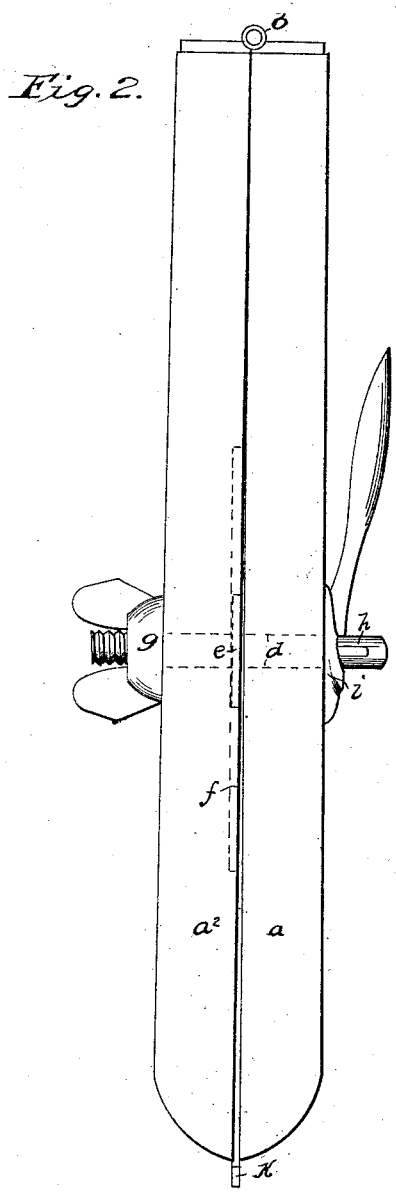
Witnesses:
Inventor

UNITED STATES PATENT OFFICE.

JOHN H. DUNBAR, OF PLYMOUTH, CONNECTICUT.

SAW-CLAMP.

Specification of Letters Patent No. 29,956, dated September 11, 1860.

*To all whom it may concern:*

Be it known that I, JOHN H. DUNBAR, of Plymouth, county of Litchfield, and State of Connecticut, have invented certain new and useful Improvements in Saw-Clamps; and I do hereby declare that the same is described and represented in the following specification and drawings; and to enable others skilled in the art to make and use my said improvement I will proceed to describe its construction and operation, referring to the drawings, in which the same letters indicate like parts in each of the figures.

The object of this improvement is to render the hitherto unpleasant labor of filing saws (especially circular saws) more agreeable, the disagreeableness of which arises from the inconvenient mode of holding them, especially circular saws, so as to effectually and firmly clamp them, to prevent chatter. For unless the saw is firmly secured in a vise or clamp, the labor is not only very disagreeable, but a file will not do near as much service. The chatter of the saw tends to injure the saw more than the filing.

The nature of this improvement consists in providing properly formed clamps, which may be secured to any desirable place or position for use, by any of the ordinary fastenings, and of forming in the said clamps an adjustable fulcrum, on which the eye of the saw is placed turns and its toothed edge is kept in its proper relation to the edge of the clamps, while the filing is being performed and also in the making of the said fulcrum, so that it may be readily adjusted to receive and hold a saw of any diameter, and also to receive and remove a saw, nearly or quite as quick as though it were placed in the jaws of an ordinary vise.

In the accompanying drawings Figure 1, is a side view; Fig. 2; is an edge view.

$a$, are the jaws, or clamps made in any desirable shape required for use.

$b$, is the joint which holds the lower parts of the clamps together.

$c$, is a slot formed in the jaws $a$, for the fulcrum $d$, nearly in the center of the fulcrum pin or bolt $d$, is formed a collar $e$, which is fitted to, and moves in the recess $f$, each side of the slot $c$, in the jaw $a'$. Said fulcrum is moved and held in the desired place by means of a cam or nut $g$,—on the other end of the fulcrum pin or bolt $d$, is formed a protuberance or bit $h$, over which the side cam $i$,—having a slit $x$, made therein corresponding to protuberance or bit $h$,—is placed, after which by giving it a quarter turn (more or less) secures the saw $k$, firmly between the jaws $a$. Now it will be clearly seen that by simply turning the side cam $i$, about a quarter turn (more or less) it will easily and quickly detach itself from the bolt or bit $h$,—the jaw $a$, thrown open, the bolt $d$, adjusted to the proper place to receive and hold a saw, of any given size or diameter, in the required place, or position, when the said jaw $a$, is again brought up to its place, the cam $d$, replaced, and by a partial turn thereof the saw $k$ is effectually secured between the jaws $a$, for filing.

I believe I have thus described the nature, its construction and the operation of my improvement, so as to enable a person skilled to make and use the same.

What I claim therefore and desire to secure by Letters Patent is—

An improved article of manufacture, viz: The slotted jaws $a$, fulcrum pin or bolt $d$, having the collar $e$, nut $g$, in combination with the lever cam $i$, substantially as and for the purpose described.

In testimony whereof I have hereunto set my hand and seal this 21st day of August 1860.

JOHN H. DUNBAR. [L. S.]

Witnesses:
ANNIE GIDDINGS,
EDWIN A. POTTER.